C. L. FRIDAY.
CONDIMENT HOLDER.
APPLICATION FILED DEC. 13, 1913.
1,127,611.
Patented Feb. 9, 1915.
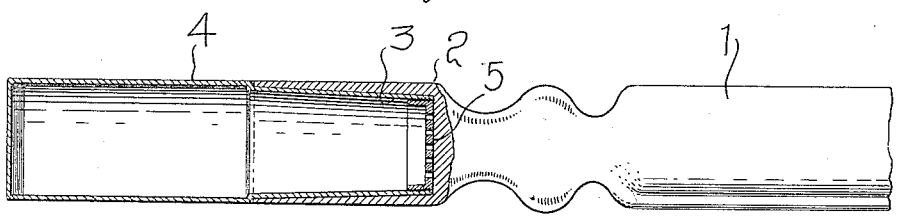
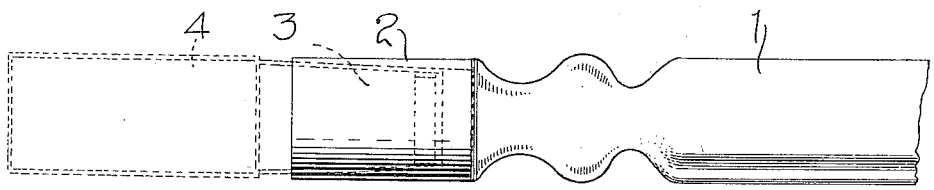
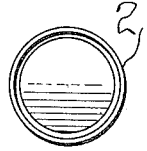  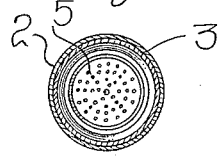
Inventor
CHESTER L. FRIDAY
Witnesses
By Watson E. Coleman
Attorney

UNITED STATES PATENT OFFICE.

CHESTER L. FRIDAY, OF QUINCY, ILLINOIS.

CONDIMENT-HOLDER.

1,127,611.     Specification of Letters Patent.     Patented Feb. 9, 1915.

Application filed December 13, 1913. Serial No. 806,513.

*To all whom it may concern:*

Be it known that I, CHESTER L. FRIDAY, a citizen of the United States, residing at Quincy, in the county of Adams and State of Illinois, have invented certain new and useful Improvements in Condiment-Holders, of which the following is a specification, reference being had to the accompanying drawings.

This invention comprehends certain new and useful improvements in condiment holders and has for its primary object to provide a device of this character which may be incorporated in the handle of a knife, fork, or the like, and serve to hold salt, pepper, or other condiment.

Another object is to provide a device of this character which will be of extremely simple construction and operation and which will be secured in the handle in such manner that while the implement is in use, it will be impossible for the condiment to escape, as the perforated end of the condiment holder is completely surrounded by the portion of the implement handle within which said holder is engaged.

A further object is to provide a device of this character which will be constructed and incorporated in the implement handle in such manner that it will form a part of said handle, but may be readily removed from the main portion of the implement handle, when desired.

A still further object is to generally improve and simplify the construction of devices of this character and increase the efficiency thereof and at the same time, reduce the cost of manufacture of the devices.

With the above and other objects in view, my invention consists in certain novel constructions, combinations, and arrangements of parts to be hereinafter more fully described, claimed and illustrated in the accompanying drawings, in which, Figure 1 is a longitudinal sectional view through my improved device; Fig. 2 is an elevational view of the condiment holder in dotted lines; Fig. 3 is an end elevational view of the implement handle, looking at the outer end thereof; and Fig. 4 is a transverse sectional view through the complete device.

Referring more specifically to the drawings in which similar reference characters designate corresponding parts throughout the several views, 1 designates a knife of conventional form, the handle 2 of which is made hollow and preferably of cylindrical form, the interior of which tapers slightly toward its inner end to receive the reduced upper or discharge end 3 of the condiment holder 4, having the perforated cap 5 secured upon its upper end in any preferred and well known manner.

It will be understood that the reduced end 3 of the condiment holder 4 is preferably slightly tapered to correspond with the tapered interior of the hollow knife handle 2, whereby the condiment holder may be readily forced into position to frictionally engage the interior of said hollow handle 2, thereby securely retaining the condiment holder in position.

While I have shown and described the condiment holder as being of circular form in cross-section, it will be understood that it may be of any form desired and that the hollow handle may constitute a portion of a handle of an implement other than a knife, if desired.

While I have shown the preferred embodiment of my invention, it will be understood that minor changes in the details of construction and arrangement of parts may be made within the scope of the appended claims without departing from the spirit of my invention or sacrificing any of the advantages of the same.

What is claimed is:—

1. The combination with an implement having a handle provided with a socket, of a condiment holder formed at one of its ends to fit into said socket and when engaged therein constituting a continuation of the handle, said holder having outlet orifices at one end closed by the base wall of said socket.

2. The combination with an implement having a handle provided with a socket, of a condiment holder having a body of the same transverse configuration as said handle and provided with an end portion to be fitted into said socket, the latter end of said holder being provided with outlet orifices closed by contact of the end face of the holder with the base wall of said socket.

In testimony whereof I hereunto affix my signature in the presence of two witnesses.

CHESTER L. FRIDAY.

Witnesses:
 Thomas J. Dwyer,
 Earle H. Toole.